United States Patent [19]
Moore, Jr.

[11] Patent Number: 5,890,454
[45] Date of Patent: Apr. 6, 1999

[54] SWINE REARING FACILITY AND METHOD FOR REDUCING AMMONIA AND ODORS THEREIN

[75] Inventor: Philip A. Moore, Jr., Fayetteville, Ark.

[73] Assignee: Trustees of the University of Arkansas and the United States of America

[21] Appl. No.: 786,021

[22] Filed: Jan. 21, 1997

[51] Int. Cl.[6] .................................................. A01K 1/00
[52] U.S. Cl. ........................................ 119/447; 119/450
[58] Field of Search .................................... 119/447, 450, 119/171

[56] References Cited

U.S. PATENT DOCUMENTS

| | | | |
|---|---|---|---|
| 3,633,547 | 1/1972 | Stevens et al. | 119/447 |
| 3,982,499 | 9/1976 | Frankl | 119/450 |
| 4,121,539 | 10/1978 | Moore | 119/450 |
| 4,175,515 | 11/1979 | Bradley | 119/447 |
| 4,193,873 | 3/1980 | Thrasher | 119/450 X |
| 4,744,903 | 5/1988 | McAninch et al. | 210/632 |
| 4,765,900 | 8/1988 | Schwoyer et al. | 210/603 |
| 5,039,481 | 8/1991 | Pacifici et al. | 422/4 |
| 5,062,387 | 11/1991 | Anderson | 119/450 |
| 5,176,879 | 1/1993 | White et al. | 422/5 |
| 5,266,201 | 11/1993 | Letourneux et al. | 210/620 |

Primary Examiner—Michael J. Carone
Assistant Examiner—Yvonne R. Abbott
Attorney, Agent, or Firm—Arthur J. Plantamura; Needle & Rosenberg, P.C.

[57] ABSTRACT

Atmospheric conditions and environmental impact of swine rearing facilities are improved by adding alum (aluminum sulfate) in a swine manure processing system. In an embodiment, alum is added to flush water used to flush away manure which has temporarily collected on at least a portion of a floor of the facility, such as in a flushing trough. The flushed manure and water are drained and delivered to a holding pond. Preferably, the flush water is then recycled from the holding pond for subsequent flushing. In another method, alum is added to a manure slurry in a manure collection pit disposed under a slatted floor on which the swine reside. In either method, alum is added in an amount sufficient to substantially inhibit ammonia volatilization and to decrease soluble phosphorus present to provide a healthy and environmentally safe swine rearing facility and an improved agricultural fertilizer.

29 Claims, 6 Drawing Sheets

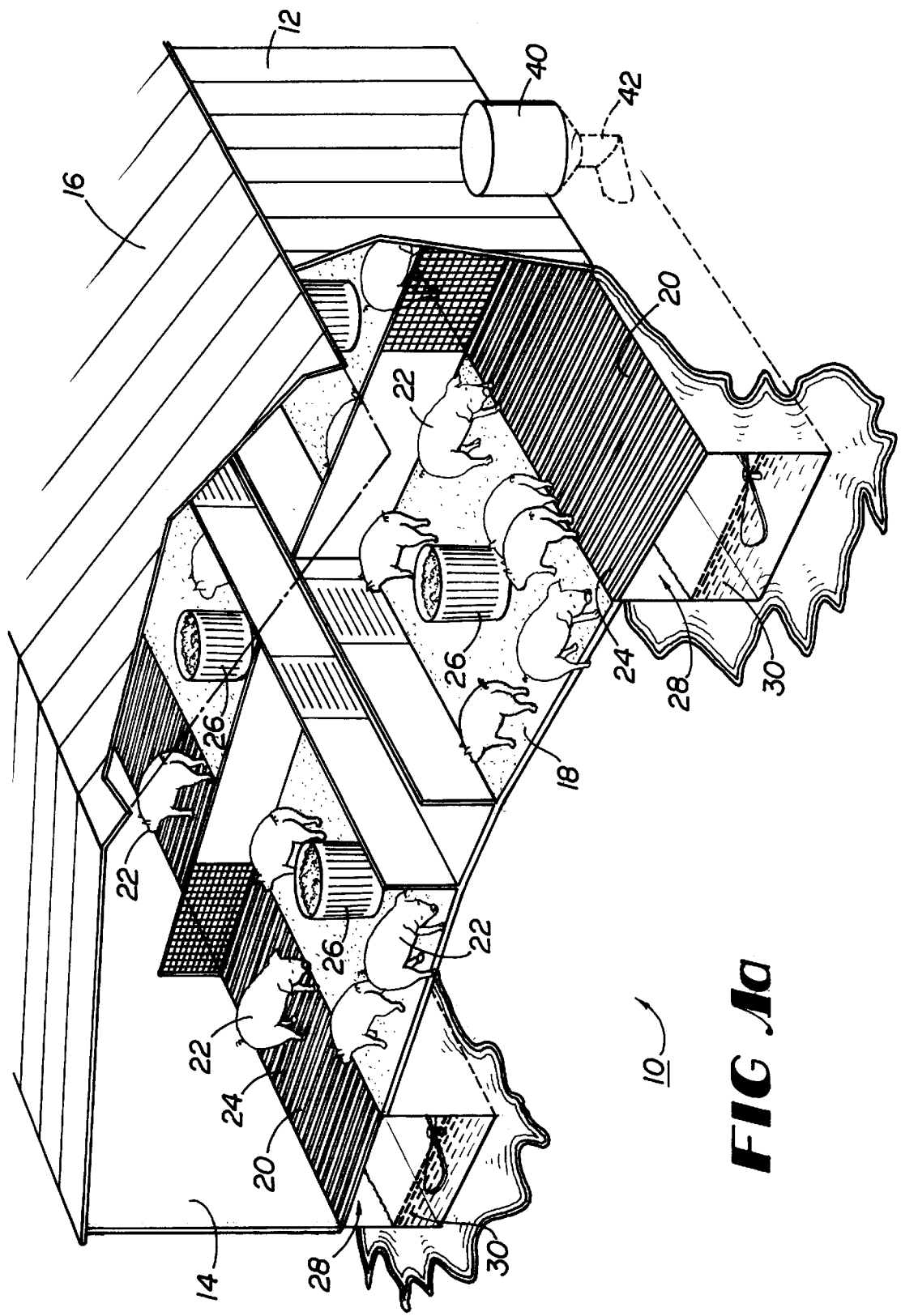

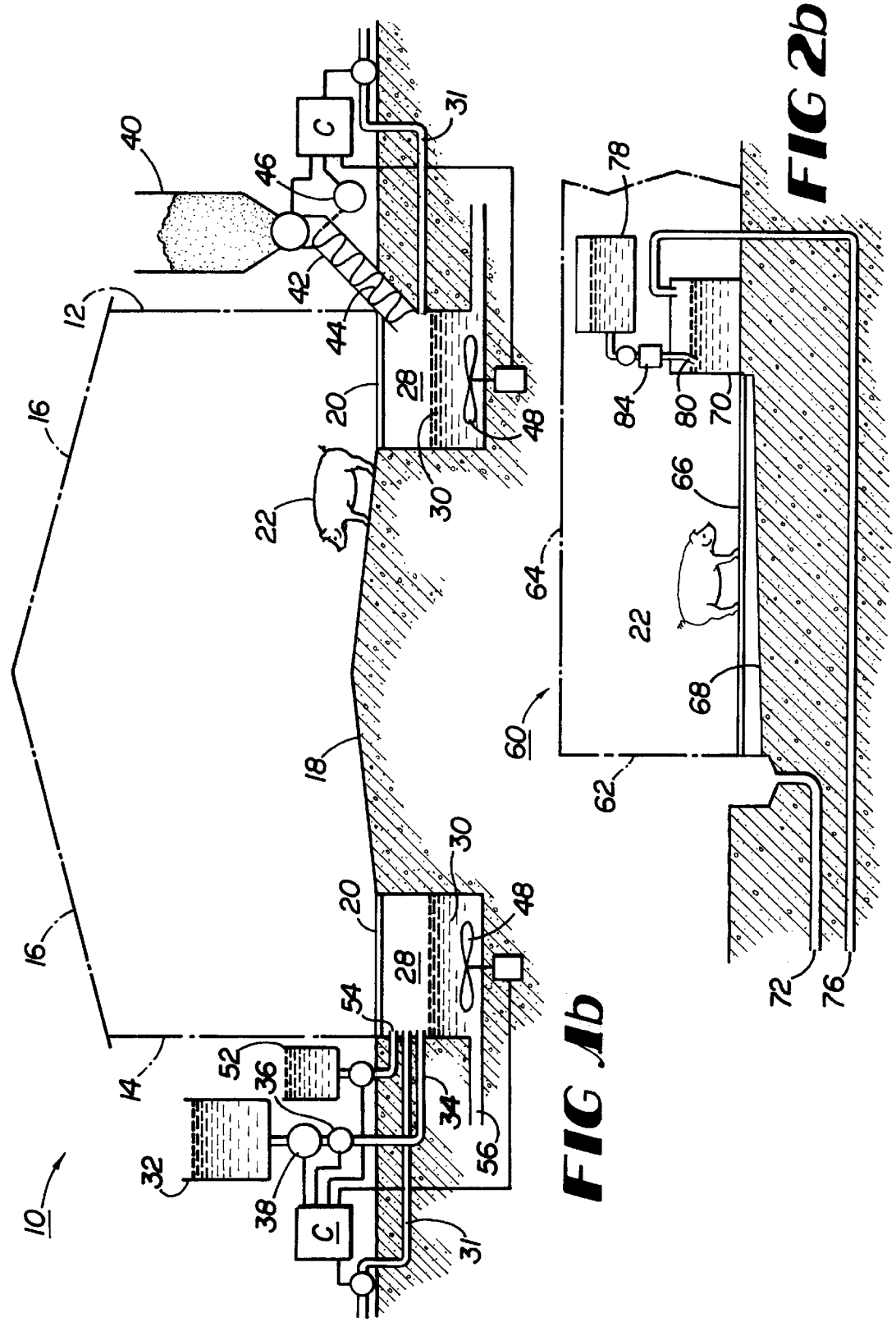

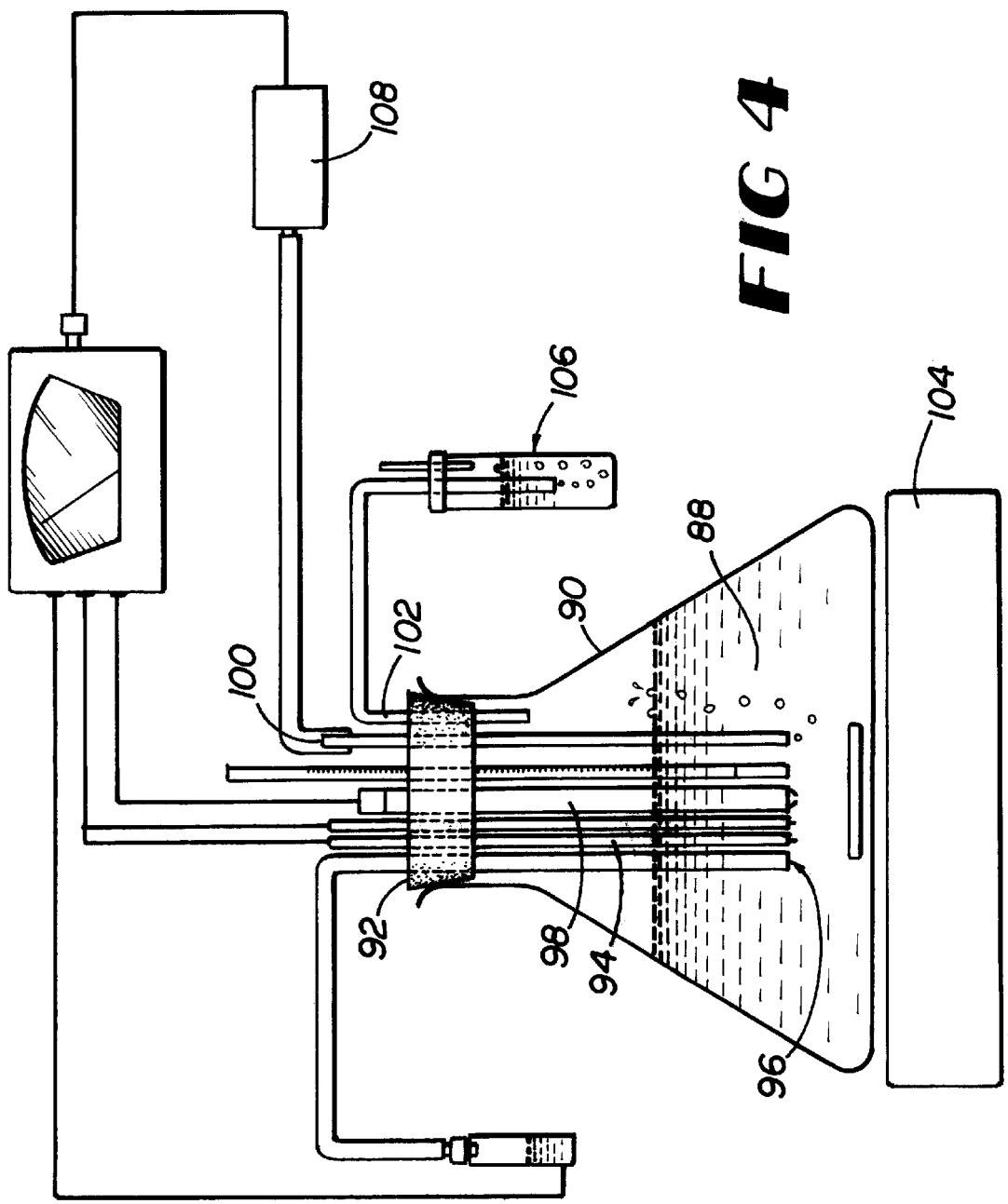

SWINE REARING FACILITY AND METHOD FOR REDUCING AMMONIA AND ODORS THEREIN

BACKGROUND OF THE INVENTION

The present invention relates to a new and improved method of manure processing to enhance conditions in a facility for raising swine (sus scrofa domesticus) and to improve environmental effects from the swine manure generated at these facilities. More specifically, the present invention relates to controlling ammonia volatilization and odors in a swine rearing facilities, as well as controlling non-point source phosphorus runoff originating from swine lagoon effluent or liquid hog manure.

Different construction designs are known for rearing facilities on swine farms. One conventional type includes a floor which includes a grate or slatted section. Manure from the swine falls through the grate into a manure collection pit. The manure must be periodically cleaned out from the pit. Another more modern type of facility includes a floor, such as a concrete floor, which has at least one flushing trough or channel defined in the floor. Manure temporarily collects on a portion of the floor, e.g., in the trough, but the trough is periodically flushed with flush water to wash the manure down through the trough to an anaerobic lagoon or holding pond. In this latter type of facility, a typical flushing system removes all of the accumulated manure every 8 to 12 hours.

Most large-scale hog rearing facilities are totally roofed confinement systems in which no absorbent bedding material is used, permitting the manure to be efficiently handled as a slurry or as a liquid. Liquid manure is significantly diluted with water to assist in transporting and applying the manure, but relatively little water is added to the excreted manure and urine in a slurry manure system.

In the aforementioned types of facilities, the accumulation of manure results in the production of ammonia gas from ammonia volatilization. This atmospheric ammonia can be produced in relatively high quantities. The water used for flushing swine facilities is typically recycled from waste storage ponds or lagoons. Nitrogen in swine lagoon effluent is mostly in the form of $NH_4$, with little of the $NO_3$ form present. The remainder of the nitrogen present is bound in organic forms. Ammonia concentrations of 350 mg/l and greater are common in lagoon effluent. In addition, swine lagoon pH values are commonly in the alkaline range (pH>7.0), so ammonia ($NH_3$) is favored over $NH_4$, resulting in conditions favorable for ammonia volatilization. When this high pH water is used for flush water, large quantities of ammonia are volatilized, causing elevated levels of ammonia gas in the atmosphere.

Studies reveal that high atmospheric ammonia levels in swine rearing facilities substantially impede feed consumption and average daily weight gain in pigs. High levels of atmospheric ammonia in swine rearing facilities have been shown to aggravate swine respiratory problems, increasing their susceptibility to micro-organisms responsible for such respiratory problems. It has been found that ammonia also increases the susceptibility of four week old pigs to conceal atrophy. Likewise, it has also been shown that high ammonia levels in swine facilities may play a significant role in the development of atrophic rhinitis. For these reasons, it is desirable to reduce the amount of ammonia gas generated within hog rearing facilities.

Ammonia ($NH_3$) volatilization from hog manure is also detrimental to the environment due to its effect on acid rain deposition. Studies indicate that atmospheric ammonia pollution plays an important role in acid rain pollution. In Europe, the dominant source of atmospheric ammonia has been found to be livestock wastes, with long-term trends showing a 50% increase in ammonia emissions in Europe between 1950 to 1980. Ammonia raises the pH of rainwater, allowing more $SO_2$ to dissolve in it, eventually forming ammonium sulfate, which releases nitric and sulfuric acid in soils upon oxidation. Experts believe that this produces two to five times the acid input to soils previously described for acid atmospheric deposition, resulting in extremely low pH values (2.8–3.5) and high levels of dissolved aluminum in non-calcareous soils.

Ammonia volatilization also greatly increases atmospheric N fallout, which contributes to eutrophication. Nitrogen deposited by wet fallout tripled in Denmark between 1955 to 1980 and corresponded to N losses from agriculture during the same period. Rising levels of N in the fallout have also been shown to be highly correlated to the $NO_3$ form nitrogen content in Danish streams.

Atmospheric ammonia can also result in the formation of ammonium nitrate particles in the air. These particles, which are usually less than two microns in size, contribute greatly to small airborne particles referred to as $PM_{10}$'s (particulate matter less than 10 microns).

Swine production is a growing industry in the United States, and the industry is building increasing numbers of the above-described swine rearing facilities in watersheds susceptible to eutrophication. As a result, various groups have expressed concern over eutrophication problems associated with traditional handling of swine manure.

In particular, modern swine rearing facilities often have high numbers of animals, but many have a relatively limited land base over which the manure may be applied. This leads to an over-application of nutrients, especially phosphorus, to the soil. Phosphorus is considered to be the primary element of concern with respect to eutrophication of freshwater systems. The threat of eutrophication due to phosphorus runoff has resulted in limits being placed on the amount of animal units produced per area of land in The Netherlands.

Accordingly, new facilities and methods are needed for rearing animals under conditions which reduce ammonia volatilization, to prevent nitrogen losses in order to improve the fertilizer value of manure to be used as an agricultural fertilizer, and to reduce the soluble phosphorus content of the manure to prevent phosphorus runoff from fields fertilized by swine manure.

SUMMARY OF THE INVENTION

In accordance with these and other objects, the present invention, in an embodiment, provides a new method for rearing swine. The method involves adding aluminum sulfate ("alum") to the water used for flushing manure collected on a swine rearing floor or by adding alum to a manure slurry in a manure holding pit located under a slatted swine rearing floor. In the embodiment where alum is added to the flush water, an amount of alum is dispensed into the flush water to preferably maintain the flush water at or below a pH of 7.5, and most preferably between 4.0 and 7.5. In the embodiment where alum is added to a manure slurry, an amount of alum is added to preferably maintain the slurry at a concentration of from about 0.25% to about 25% $Al_2(SO_4)_3 \cdot 14H_2O$. The alum is provided in a sufficient amount to inhibit ammonia volatilization, thereby providing numerous advantages.

The present invention also includes facilities which include alum delivery systems. A major advantage provided by the present invention is that it improves growth rates of swine while reducing the incidence of disease in swine rearing facilities.

Another advantage provided by the present invention is that it enhances the nutrient value of swine manure or swine manure effluent holding pond water to be used as fertilizer.

The inhibited ammonia volatilization as a result of the invention provides the advantages that the detrimental impact on the environment of swine manure is diminished by reducing acid rain pollution, by reducing atmospheric N fallout, and reducing $PM_{10}$'s associated with ammonia loss from swine manure.

An advantage of the present invention is that it decreases phosphorus solubility in liquid hog manure to precipitate soluble phosphorus.

Still another advantage provided by the invention is that it reduces offensive odors associated with swine manure.

Additional features and advantages of the present invention are described in, and will be apparent from, the following detailed description taken in conjunction with the drawings.

BRIEF DESCRIPTION OF THE DRAWINGS

FIG. 1a is a fragmentary perspective view of a slatted-floor type of swine rearing facility, the illustration having portions broken away to show details of the interior and manure collection pit.

FIG. 1b is a schematic sectional end view of the embodiment FIG. 1a.

FIG. 2b is a schematic longitudinal sectional view of the facility of FIG. 2a.

FIG. 4 is a schematic view of an apparatus used to control pH and measure ammonia volatilization from stirred swine lagoon effluent.

DETAILED DESCRIPTION OF THE PREFERRED EMBODIMENTS

Figure 2A:
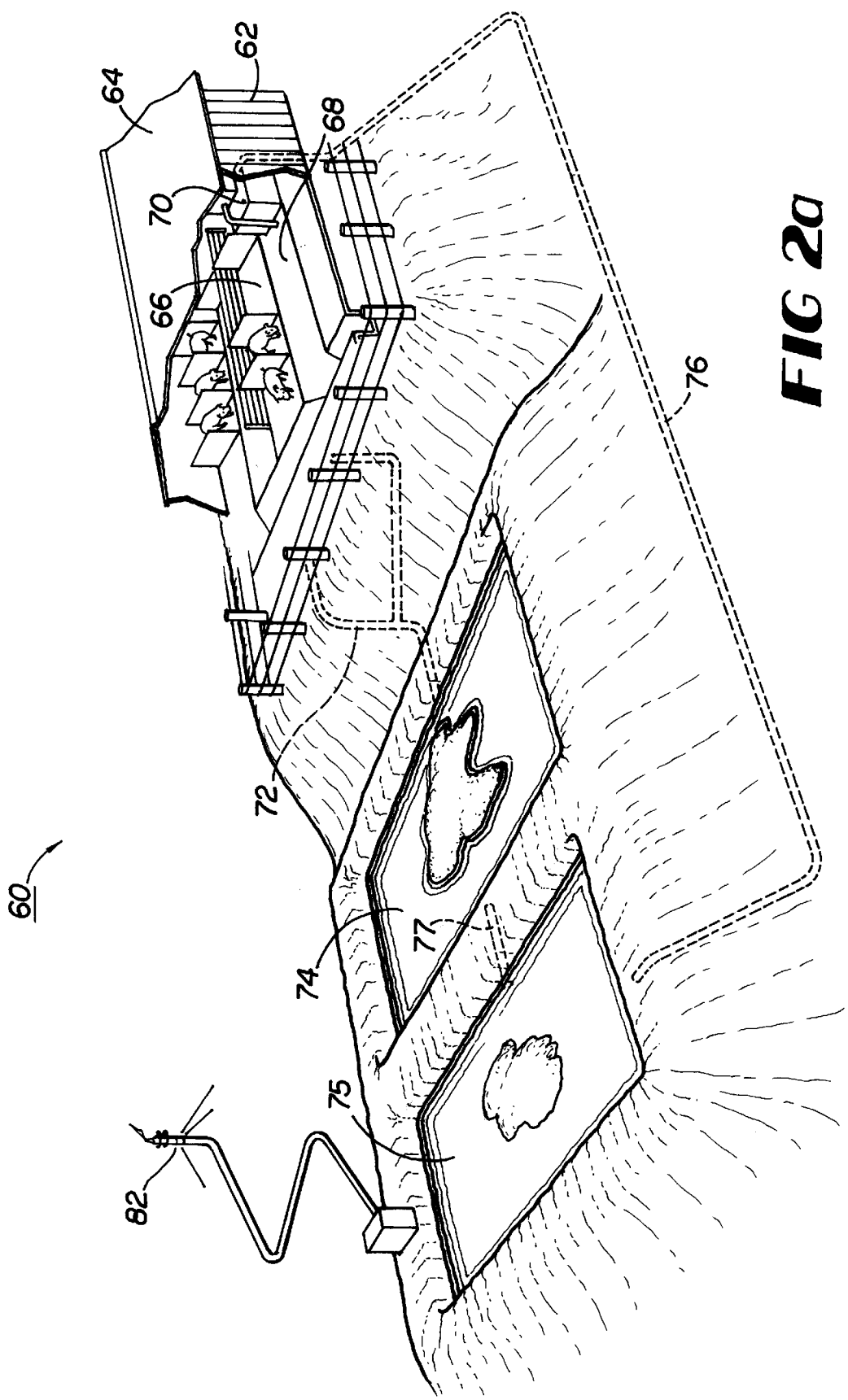
FIG. 2a is a fragmentary perspective view of flushable-floor type of swine rearing facility, the illustration having portions broken away to show details of the interior and manure collection pit.

Referring to FIGS. 1a and 1b, a swine rearing facility in accordance with an embodiment of this invention is generally indicated by reference numeral 10. Rearing facility 10 includes an enclosure having a generally rectangular configuration bounded by a plurality of upstanding peripheral sidewalls 12, 14 and is covered by a roof 16. Of course, the facility 10 includes at least one door and possibly windows (not shown) in the sidewalls 12. Moreover, ventilation fans may be provided in the sidewalls or roof.

In the embodiment of FIG. 1a and 1b, the facility 10 has an animal rearing floor including a conventional, unslatted floor section 18 and a slatted floor section 20. The unslatted section 18 may be constructed with a slight grade downward to the slatted floor section 20. The slatted floor section 20 is adapted to support hogs 22, but includes a plurality of openings 24 which allow deposited manure to fall through slatted floor section 20. In a facility having such a slatted floor section, it has been found that most hogs quickly learn and prefer to defecate on slatted floor section, as opposed to the conventional unslatted floor section. Feeding troughs 26 are preferably located on the unslatted floor section 18.

A manure storage pit 28 is located under slatted floor section 20. Manure and urine falls through the slat openings 24 into pit 28, where it accumulates and is collected in the form of a manure slurry 30. The manure slurry may be periodically removed with a hose-equipped vacuum truck and thereafter applied to agricultural land. Optionally, additional water may be added manually, such as by hosing off or flushing the floor periodically, or by means of a water delivery spicket or pipe 31 located in the pit. According to an embodiment of the invention, alum is added to the manure slurry 30 in the manure pit 28.

Various means are provided for delivering the alum to the slurry 30. Alum may be provided in solid form or as a liquid solution. A desired amount of alum, in either liquid solution form or solid powder form, may be added manually or by an automated alum delivery system.

Various means for delivering the alum solid or liquid alum solution are possible. For example, where a liquid alum solution is being used, as illustrated on the left side of FIG. 1b, a liquid solution source such as a tank 32 is connected via a pipe 34 to the manure pit 28. A valve 36 may be disposed for selectively opening or closing the flow of alum solution through the pipe 34. The alum solution may be delivered from the tank 32 to the pit 28 by gravity, if the tank is higher than the delivery point within the pit 28. Otherwise a pump 38 could be provided for pumping the solution. Depending on the pump type and the vertical position of the tank 32, a separate valve 36 might not be necessary so long as flow of the solution ceases when the pump 38 is turned off. The pipe 34 delivers the liquid solution into the pit 28 where it mixes with the slurry 30.

Also, where alum is being provided in solid or powdered form, as illustrated on the right side of FIG. 1b, a solid alum source or tank 40 may be provided which is connected via a tube 42 to the manure pit 28. According to the invention, any conventional powder-delivering device may be used. For example, an embodiment includes an auger feeder 44 disposed in the tube 42 driven by a motor 46 for a period of time to selectively transfer a desired amount of alum powder into the pit 28. In another embodiment, a sifting device could be utilized.

Note that FIG. 1b illustrates a facility having two pits 28 in a symmetrical arrangement. The left side is shown having a liquid alum solution delivery system and the right side is shown having a solid alum powder delivery system. This particular configuration is intended for illustrative purposes only. Most facilities would utilize a single type of delivery system, and a facility according to the invention could have any number of pits 28. Also, the alum delivery systems may be enclosed or located within the walls and roof.

To facilitate mixing-in of the alum, at least one agitator 48 is provided in pit 28 to stir the slurry 30. As shown in FIG. 1b, agitator 48 is a rotatable propeller, but the agitator 48 could be any device which forces circulation of the slurry 30, such as another form of mechanical stirrer, a recirculation pump, etc.

Additionally, the above liquid or solid alum delivery means may be automated to dispense the alum as needed.

For example, a controller C may be provided to actuate the valve 36, pump 38, motor 46, agitator 48, etc., at predetermined times or in response to a sensor 50 located in pit 28 to sense the pH of the slurry 30. The controller C actuates the necessary components when the slurry pH is not within a predetermined range.

The amount of alum added to the slurry depends on the number of animals in the facility and the subsequent amount of manure generated, which controls the amount of ammonia volatilization. Although the alum should be added in relatively small quantities daily or weekly, the cumulative amount of alum delivered in this system should result in an admixture that contains 2.5 to 250 grams of $Al_2(SO_4)_3.14H_2O$ per kg of manure (on a dry weight basis), with the preferred application rate resulting in approximately 100 grams $Al_2(SO_4)_3.14H_2O$ per kg of manure (equivalent to approximately 10% alum by weight).

The slurry 30 is susceptible to the formation of foam from carbon dioxide ($CO_2$) produced when the alum reacts with carbonates in the manure. Therefore, a defoaming agent is preferably also added to the slurry when adding alum. Many suitable defoamers are available, e.g., a silicone oil in water emulsion, such as 20% silica-filled poly(dialkyl siloxane) (chemical family dialkyl polysiloxane emulsion), with a silica-filled poly (dimethyl siloxane) being preferred. Of course, the possible defoaming aspect of the invention is not limited to this chemical alone, and other de-foaming agents known to those skilled in this art may also be used.

Like the alum, the defoaming agent may be added manually or by an automated delivery system. The defoaming agent could mixed with at the alum source 32, 40, or a separate delivery system could be provided including a defoaming agent source such as a tank 52. The tank 52 could also be gravity fed to the pit 28 via a valve-controlled pipe 54.

The slurry 30 must be periodically removed from the pit 30. An effluent removal pipe 56 leads from the pit 28 through which the slurry may be drained or pumped out for further manure processing.

Turning now to FIGS. 2a and 2b, another swine rearing facility according to an embodiment of the invention is generally indicated by the reference numeral 60. Rearing facility 60 also includes a generally rectangular enclosure bounded by a plurality of upstanding peripheral sidewalls 62 and covered by a roof 64. In the embodiment of FIG. 2a and 2b, the facility 60 has one or more flat or slightly graded swine rearing floor 66 on which hogs 22 reside. The floor also includes at least one drain channel or flushing trough 68 recessed into the floor 66. Hogs 22 usually learn to defecate in the trough. Thus, manure from the hogs collects in the trough, which is periodically flushed off with flush water stored in a reservoir 70.

The flushing action carries the manure and flush water down the flushing trough 68, through a channel or drainpipe 72 to a treatment system. Here, a two-stage treatment system is shown, including a swine effluent anaerobic treatment lagoon 74 into which the effluent is initially delivered. The effluent is subsequently transferred through a transfer conduit 77 from the lagoon 74 to a holding pond 75, as shown in FIG. 2a. Quantities of effluent are removed from the pond 75 for irrigation of soil with an irrigation device 82. Preferably, lagoon water is recycled from the pond 75 for use again as flush water. As illustrated, the recycled lagoon water is pumped from the pond 75 through a pipe 76 back into the reservoir 70 for subsequent flushing.

According to a method of the invention, alum is added to the flush water in the flush water reservoir 70 prior to flushing. In the embodiment of FIGS. 2a and 2b, various means are possible for delivering the alum to the flush water. As discussed above in connection with the slatted-floor facility, alum may be provided either in solid form or as a liquid solution, and may be supplied manually or by an automated delivery system. The preferred embodiment of FIG. 2b may use an alum delivery means similar to those described in connection with the embodiment of FIGS. 1a and 1b, except that the delivery means here, in an embodiment, provides alum powder or liquid solution to the reservoir 70. In the preferred embodiment, a predetermined quantity of liquid alum solution (preferably approximately 48.5% by weight alum) is dispensed in the flushing trough 68 as it fills up with flush water.

As illustrated in FIG. 2b, where a liquid alum solution is being used, a liquid solution source or tank 78 is connected to a pipe 80 leading to the reservoir 70. The alum delivery may be a gravity-feed system, having a valve 82 connected for selectively opening or closing the flow of alum solution through the pipe 80. A pump 84 could also be used for pumping the solution from the tank 78 through the pipe 80. As described in connection with FIGS. 1a and 1b, the controller C may be programmed to actuate the pump 84 for a predetermined time in order to deliver a desired amount of alum.

In the embodiments of the invention, alum lowers the pH of the flush water or liquid manure, converting ammonia ($NH_3$) to ammonium ($NH_4^+$), which combines with sulfate ($SO_4^{2-}$) to form ammonium sulfate ($(NH_4)_2SO_4$), a water-soluble nitrogen fertilizer. This process increases the fertilizer value of the manure, while improving the atmosphere inside the swine-rearing facility and its environs for both animals and humans alike.

Figure 3:
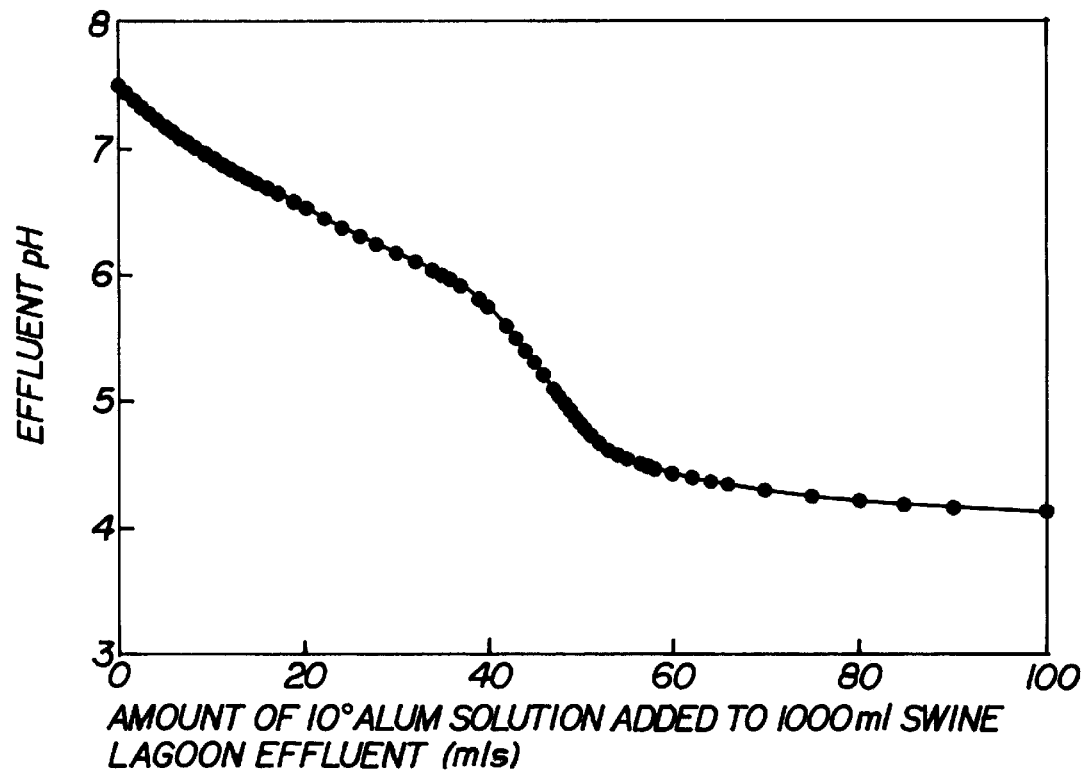
FIG. 3 is a graphical plot illustrating the effect of alum addition on the pH level of holding pond or lagoon effluent.

In the embodiment of FIG. 2a and 2b, the amount of alum needed is determined by the size of the reservoir 70 and by the alkalinity of the water to be utilized for flushing. To determine the amount of liquid alum needed per liter of effluent (e.g., lagoon water, or whatever the water source may be), the following procedure may be used:

(a) A predetermined quantity of water to be used for flushing is obtained, e.g., 1000 ml. A 10% alum solution is slowly stirred into the water, and the pH of the water is measured as subsequent alum additions are made. The amount of alum is noted which is needed to decrease the pH to 7.5, 7.0, 6.5, 6.0, etc. This is basically an acid-base titration, with the alum being the acid. An example of the results from a titration of swine lagoon effluent with a 10% alum solution is shown in FIG. 3.

(b) The amount of alum needed per flush is calculated using the volume of water held by the flush tank 70, by simply multiplying the number of liters contained in the tank by the amount of alum required to reduce the pH to desired level.

The aluminum sulfate concentration in the alum solution could be varied from approximately 1% to 50% by weight, however, the most commonly used solution contains 48.5% by weight dry aluminum sulfate in water. This is equivalent to 5.4 lbs. of dry alum per U.S. gallon.

For optimal benefit of the invention described herein, no bedding material or any sort of absorbent "litter" material is used. Hence, the method of the invention does not involve the addition of alum to animal bedding or litter, but rather relates to the adding of alum to water or directly to manure, where the physical state of the manure may vary from a solid composed of mainly manure to a liquid slurry which may have much more water than manure.

The following experiment was conducted to determine the effect of alum on ammonia volatilization from swine lagoon effluent (i.e.—the water that would normally be used to flush modern swine houses) and to ascertain the effects of alum on phosphorus solubility in swine lagoon effluent:

(a) 2500 mls of swine lagoon effluent 88 were added to each of six 3-L fernbach flasks 90. The flasks 90 were stoppered with #13 rubber stoppers 92 which held two redox (Pt) electrodes 94, a salt bridge 96, a pH electrode 98, and glass tubing gas inlet 100 and gas outlet 102, as shown in FIG. 4. The microcosms were continuously stirred, using magnetic stirrers 104. The pH of the water was adjusted to 6.0, 6.5, 7.0, 7.5, 8.0 and 8.5 with a 10% alum solution or with a 1N NaOH solution (for pH 8.5), as needed. Air provided from aquarium pumps 108 was continuously bubbled through each microcosm for the seven-day duration of the experiment. The amount of ammonia volatilization from each microcosm was determined by trapping the evolved ammonia in boric acid traps 106, which were titrated with 0.01N HCl to determine the ammonia content.

(b) At the end of the study, 100 ml samples were withdrawn from each microcosm using a large syringe. Unfiltered water samples were analyzed for alkalinity, electrical conductivity (EC), and metals. Samples taken for soluble metals (including phosphorus) were filtered through a 0.45 μm millipore membrane filter and acidified with concentrated HCl (2 drop/20 ml sample). Metals (Al, B, Ca, Cd, Cu, Fe, K, Mg, Mn, Na, P, Pb, and Zn) were determined with an inductively coupled argon plasma emission spectrophotometer (ICAP).

Figure 5:
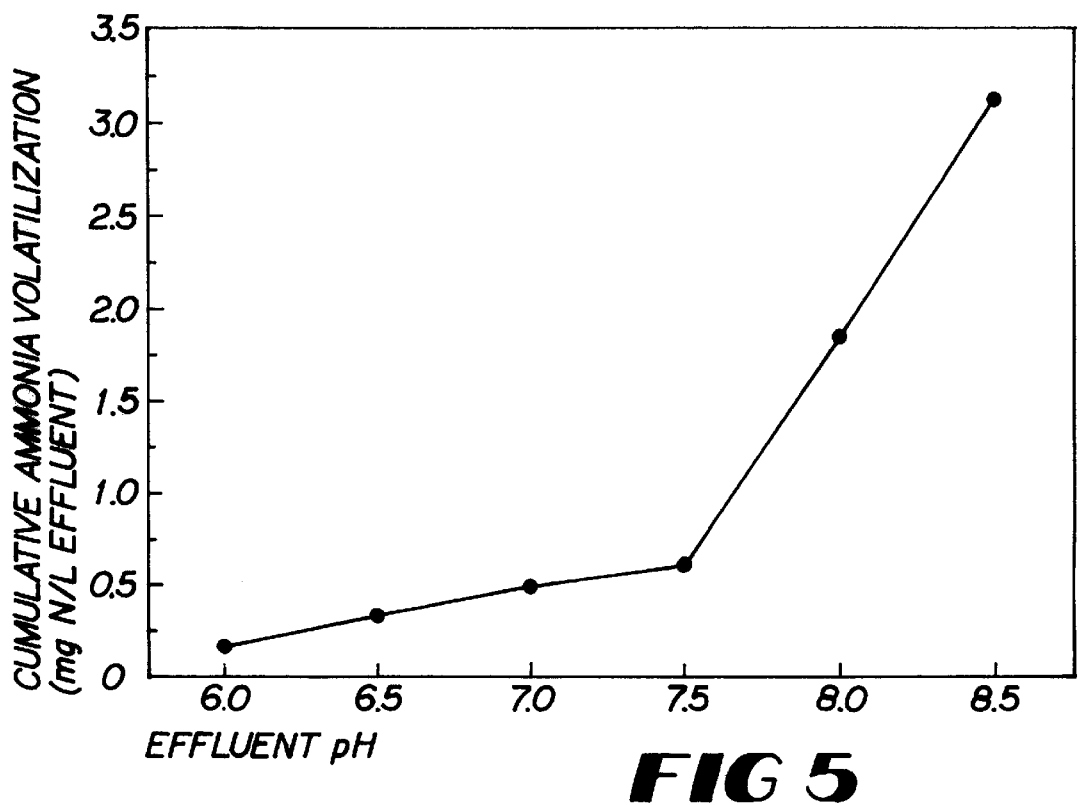
FIG. 5 is a graphical plot illustrating cumulative ammonia volatilization during one week from swine lagoon effluent buffered with alum at various pH levels.
Figure 6:
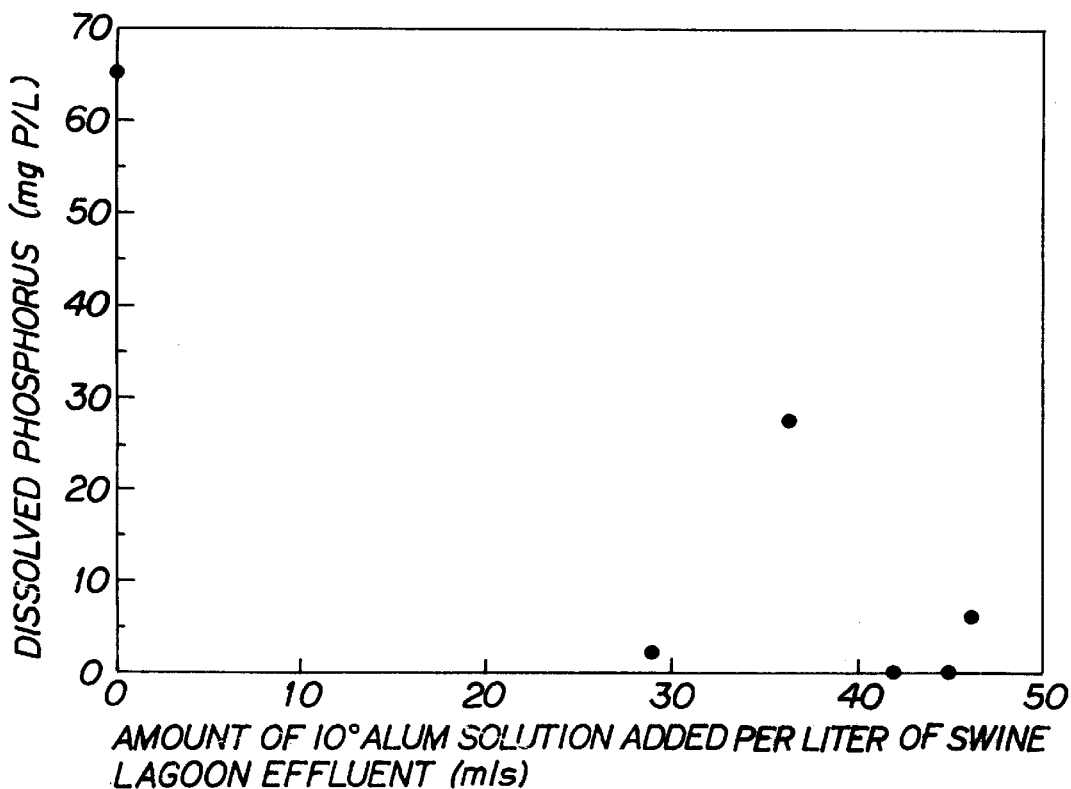
FIG. 6 is a graphical plot illustrating the effect of alum addition on dissolved phosphorus in swine lagoon effluent.
Figure 7:
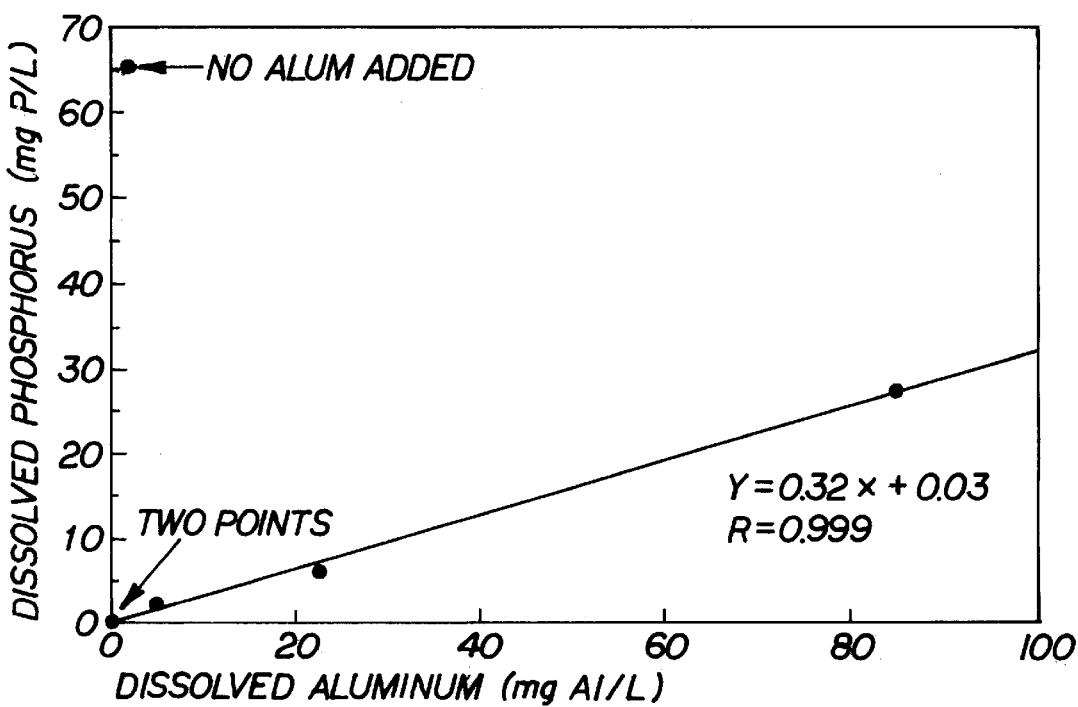
FIG. 7 is a graphical plot illustrating the relationship between soluble phosphorus and soluble aluminum in swine lagoon effluent both treated with alum and untreated.

The results of this experiment are shown in FIGS. 5, 6, and 7. Alum greatly decreased the amount of ammonia volatilization, especially at pHs of 7.5 or less, as shown in FIG. 5. The reason for this decrease is a shift in the equilibrium from ammonia to ammonium, as described earlier.

Alum additions also reduced soluble phosphorus levels, with the lowest soluble phosphorus levels observed at pH 6.5 and 7.0 (FIG. 6). At these pHs the soluble phosphorus levels in the lagoon water were approximately 0.2 mg per liter. This is much lower than the 67 mg P/L observed in untreated lagoon effluent. By lowering soluble phosphorus levels, the amount of phosphorus runoff from pastures fertilized (e.g., by irrigation) with alum-treated lagoon effluent is much lower than that for untreated lagoon water.

It is believed that the decrease in phosphorus solubility from the addition of alum is caused by a precipitation of an aluminum phosphate mineral. The plot of FIG. 7 supports this. Soluble phosphorus levels were highly correlated to soluble aluminum levels (R=0.999), indicating mineral dissolution/precipitation reactions are occurring. However, it is also possible that an $Al(OH)_3$ compound forms, which absorbs the phosphorus. The actual mechanism of action is unimportant, since the result of either is a decrease in phosphorus solubility.

Those skilled in the art, without undue experimentation, will be able to calculate the relative amounts of alum which will be required for various hog rearing facilities. It should be noted that the amounts and levels disclosed are provided for general guidance, but that many different factors can influence the amount of alum needed to properly reduce ammonia volatilization of swine manure effluent. Accordingly, actual necessary amounts delivered daily or weekly may vary. Some of the factors which influence the amount of alum which might be needed include the breed of hogs involved, the numbers of hogs and their diet. More particularly, the amount of alum needed to lower the manure pH sufficient to reduce ammonia volatilization will generally increase as the amount of $CaCO_3$ in the diet of the hogs increases or vice-versa.

Various changes and modifications to the presently preferred embodiments will be apparent to those skilled in the art. For example, according to the invention, alum is added to be mixed with liquid manure or a manure slurry. Various styles of hog rearing facilitates may incorporate the addition of alum at various manure processing stages in a manner which differs from the particular embodiments described but which provides the advantages provided by the invention. It will be understood also, that with appropriate modifications as applicable in each instance, and as would be apparent to those skilled in the art, the present invention, consistent with the teaching herein provided, may be applied to other animals to afford the essential advantages described herein of using alum to attain ambient ammonia reduction and in the disposition and processing of manure from housing facilities for such animals. It is contemplated that the invention, in addition to the application to swine may be applied in connection with the rearing and/or housing of other livestock such as cattle, horses, goats, sheep, rabbits and the like. All such obvious changes and modifications may be made herein by those skilled in this art without departing from the spirit and scope of the present invention as defined by the appended claims.

What it claimed is:

1. A swine-rearing method comprising:
    housing swine in an enclosure including a floor, providing a supply of flush water;
    temporarily collecting manure on at least a portion of the floor;
    periodically flushing said portion of the floor with flush water from said supply to carry a mixture of the manure and the flush water from said floor; and
    adding an ammonia volatilization control agent consisting essentially of aluminum sulfate to the mixture to form a treated mixture.

2. A method as defined in claim 1, wherein said portion is a recessed flushing trough.

3. A method as defined in claim 2, wherein the aluminum sulfate is delivered to the flushing trough.

4. A method as defined in claim 1, wherein the aluminum sulfate is added to the flush water prior to flushing in an amount sufficient to substantially inhibit ammonia volatilization from the treated mixture.

5. A method as defined in claim 1, wherein the aluminum sulfate is added in an amount sufficient to maintain the pH of the treated mixture at or below a pH of about 7.5.

6. A method as defined in claim 1, wherein the aluminum sulfate is added in an amount sufficient to maintain the treated mixture at a pH between about 4.0 and about 7.5.

7. A method as defined in claim 1, wherein said aluminum sulfate is in the form of a liquid solution.

8. A method of claim 1, wherein said aluminum sulfate is in the form of a liquid solution having a concentration from about 1% to about 50% aluminum sulfate by weight.

9. A method as defined in claim 1, wherein said aluminum sulfate is added in the form of a solid.

10. A method as defined in claim 1, further comprising:
    delivering the treated mixture to a holding pond;
    and separating at least a portion of said flush water in said treated mixture in the holding pond and returning the separated portion to the supply for reuse.

11. A swine-rearing method comprising:

housing swine in an enclosure including a floor adapted to support swine and having a plurality of openings to permit swine urine and manure to fall through the floor, the enclosure also including a manure storage pit located under the floor;

collecting manure and urine which falls through the floor in said storage pit as a manure slurry; and adding an ammonia volatilization control agent consisting essentially of aluminum sulfate to the manure slurry in the pit.

12. A method as claimed in claim 11, wherein the aluminum sulfate is added in an amount sufficient to substantially inhibit ammonia volatilization.

13. A method as defined in claim 12, wherein aluminum sulfate is added in an amount resulting in a concentration of aluminum sulfate in the slurry from about 0.25% to about 25% by weight of aluminum sulfate based on the weight of manure present.

14. A method as defined in claim 12, wherein aluminum sulfate is added to the slurry in an amount resulting in an admixture containing from about 2.5 to about 250 grams of aluminum sulfate per kg of manure.

15. A method as defined in claim 12, wherein aluminum sulfate is added in an amount resulting in a concentration of aluminum sulfate in the slurry of about 100 grams of aluminum sulfate per kg of manure.

16. A method as defined in claim 12, further comprising agitating the slurry to mix the aluminum sulfate.

17. A method as defined in claim 12, wherein a defoaming agent is added to the slurry.

18. A method as defined in claim 17, wherein the defoaming agent is a silicone oil in water emulsion.

19. A method as defined in claim 17, wherein the defoamer is 20% silica-filled polydimethyl siloxane.

20. A method for improving atmospheric conditions in a swine-rearing facility, wherein swine are reared in an enclosure including a collection vessel and manure and urine from the animals is collected in the form of a slurry in the collection vessel, said method comprising:

adding an ammonia volatilization control agent consisting essentially of aluminum sulfate to the manure slurry in the collection vessel.

21. A method for reducing odors associated with a swine rearing facility, wherein swine are reared in an enclosure including a collection vessel and manure and urine from the animals is collected in the form of a slurry in the collection vessel to a manure collection level, said method comprising:

adding an ammonia volatilization control agent consisting essentially of aluminum sulfate to the manure slurry in the collection vessel.

22. A method for reducing acid rain and particulate matter less than 10 microns ($PM_{10}s$) associated with atmospheric ammonia pollution originating from an animal rearing facility, wherein animals are reared in an enclosure including a collection vessel and manure and urine from the animals is collected in the form of a slurry in the collection vessel, said method comprising:

adding an ammonia volatilization control agent consisting essentially of aluminum sulfate to the manure slurry in the collection vessel.

23. A method as defined in claim 22, wherein the animals are swine, dairy cows, beef cattle, goats, sheep or horses.

24. A method for reducing phosphorus solubility of and non-point source phosphorus pollution arising from manure fertilizers obtained from a swine rearing facility, wherein swine are reared in an enclosure including a collection vessel and manure and urine from the animals is collected in the form of a slurry in the collection vessel, said method comprising:

adding an agent for reducing phosphorus solubility consisting essentially of aluminum sulfate to the slurry in the collection vessel.

25. A method for enhancing the nitrogen content of swine manure for use as an agricultural fertilizer, said method comprising the steps of:

rearing swine in a swine rearing facility including a collection vessel and manure and urine from the swine is collected in the form of a slurry in the collection vessel; and adding an ammonia volatilization control agent consisting essentially of aluminum sulfate to the slurry in the collection vessel.

26. A method for improving animal productivity by improving weight gains, feed conversion, disease resistance and the like, said method comprising the steps of raising animals in an animal rearing facility having low atmospheric ammonia levels wherein the animal rearing facility includes a collection vessel, and by collecting manure and urine from the animals in the form of a slurry in the collection vessel; and adding an ammonia volatilization control agent consisting essentially of aluminum sulfate to the slurry in the collection vessel.

27. A swine-rearing method comprising:

housing swine in an enclosure including a floor, providing a supply of flush water;

temporarily collecting manure on at least a portion of the floor;

periodically flushing said portion of the floor with flush water from said supply to carry a mixture of the manure and the flush water from said floor; and adding an ammonia volatilization control agent consisting essentially of aluminum sulfate and a defoaming agent to the mixture to form a treated mixture.

28. A method as defined in claim 27, wherein the defoaming agent is a silicone oil in water emulsion.

29. A method as defined in claim 27, wherein the defoaming agent is a 20% silica-filled polydimethylsiloxane.

* * * * *